(12) United States Patent
Benson et al.

(10) Patent No.: US 6,411,396 B1
(45) Date of Patent: Jun. 25, 2002

(54) IMPOSITION IN A RASTER IMAGE PROCESSOR

(75) Inventors: Craig H. Benson, Fremont; John T. Green, San Jose; Michael Parker, Los Gatos, all of CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/256,808

(22) Filed: Feb. 24, 1999

(51) Int. Cl.[7] .................... B41B 15/00; B41J 15/00; B41J 5/30; B41J 3/42; B41J 11/44

(52) U.S. Cl. ............... 358/1.18; 358/1.15; 358/1.9; 358/1.1; 400/61; 400/70; 400/76

(58) Field of Search .................. 358/1.18, 1.15, 358/1.9, 1.1, 1.17, 1.12, 1.16, 457, 460, 444; 400/61, 70, 76

(56) References Cited

U.S. PATENT DOCUMENTS 5,988,899 A * 11/1999 Benson .................. 400/61
6,046,818 A *  4/2000 Benson .................. 358/1.18

* cited by examiner

*Primary Examiner*—Edward Coles
*Assistant Examiner*—Twyler Lamb
(74) *Attorney, Agent, or Firm*—Fish & Richardson P.C.

(57) ABSTRACT

A method for imposing and rendering image data. The method formatting the image data for a surface of a media sheet in an output device space and including receiving one or more page description files defining one or more objects to be located on the surface of the media sheet, receiving a job ticket defining a layout of the objects on the surface in a sheet-defined space. Prior to ripping, the layout of the objects is transformed into output device space including rotation or translation of the objects. The objects are ripped creating raster data that is oriented in output device space. The raster data is blitted in blocks without shifting the raster data.

19 Claims, 4 Drawing Sheets

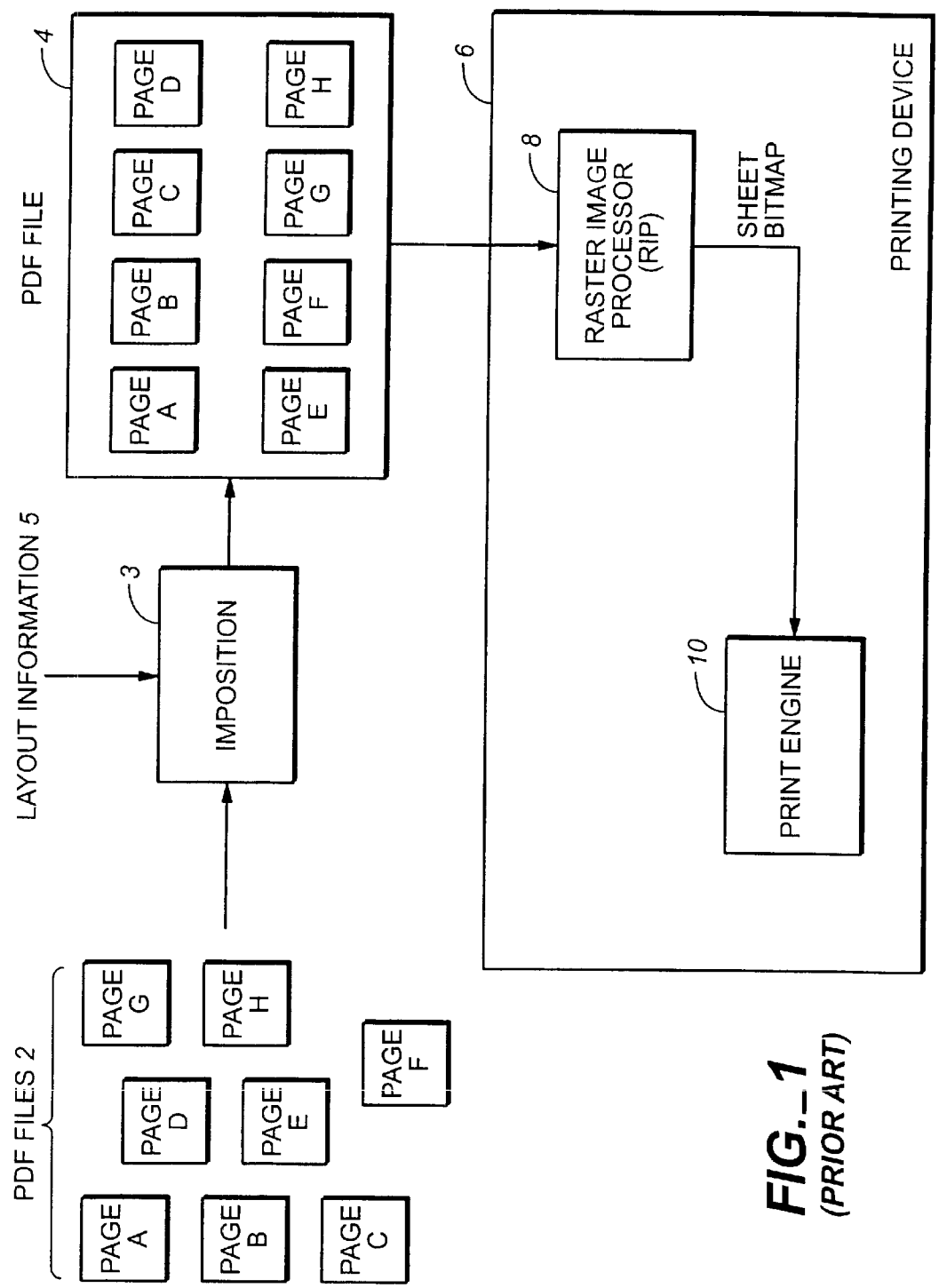
FIG._1 (PRIOR ART)

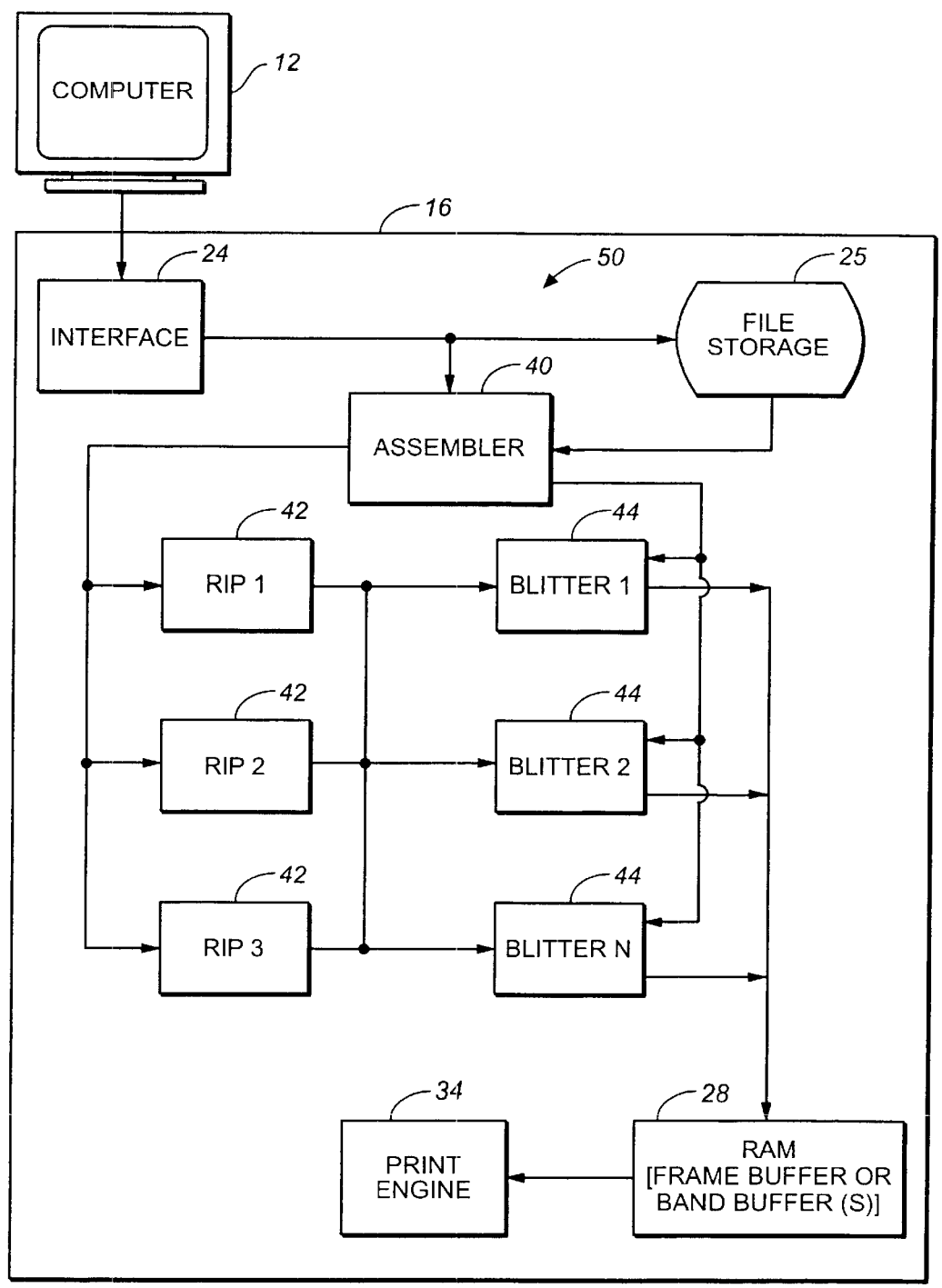
FIG._2

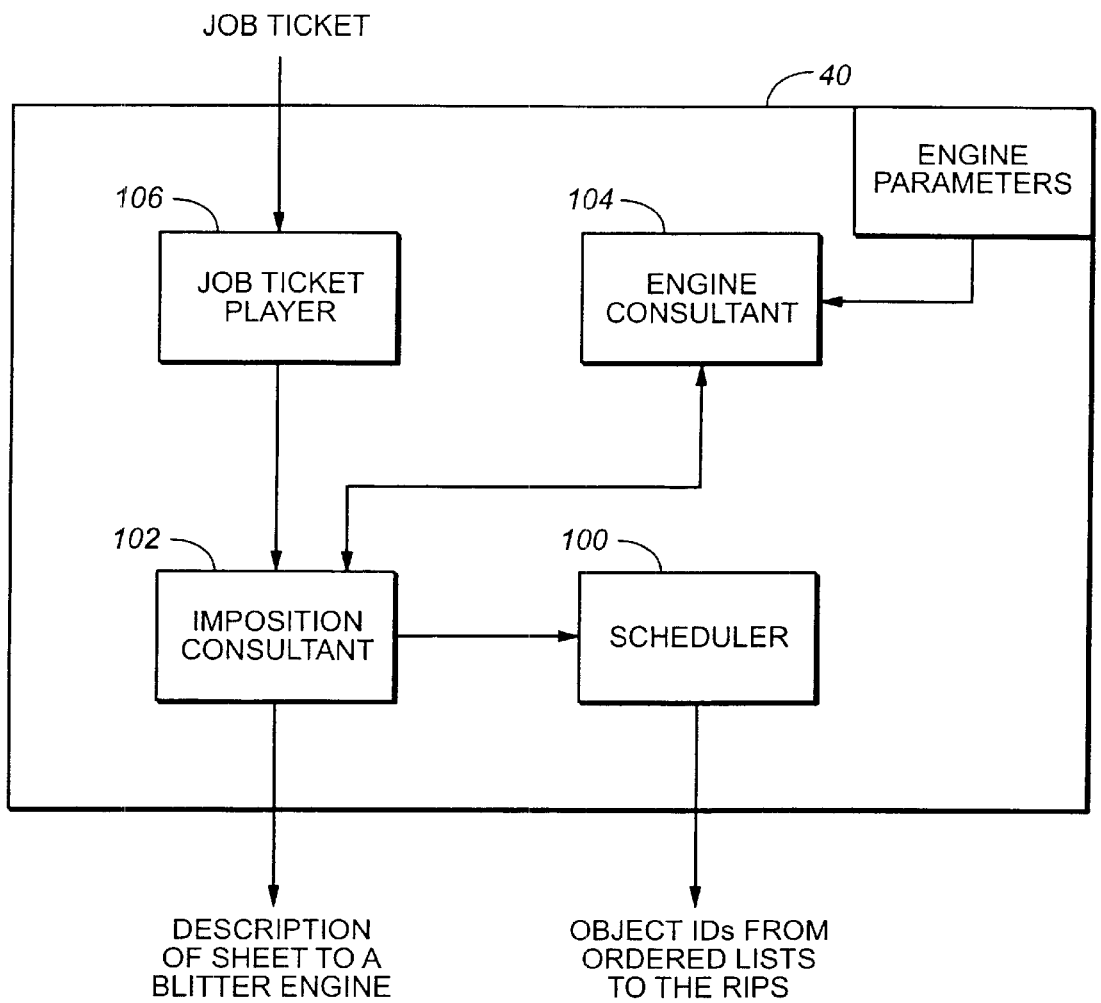
FIG._3

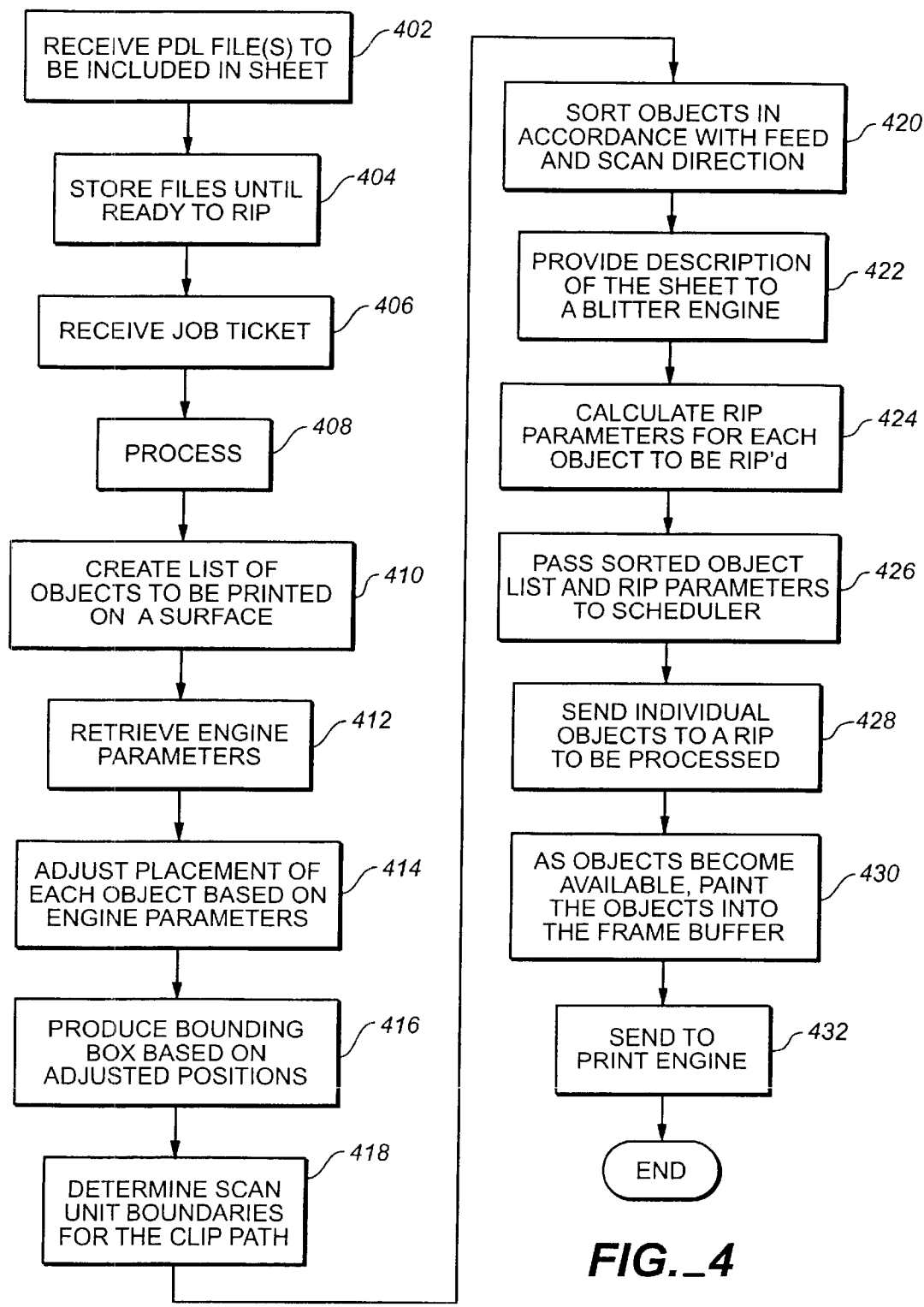
FIG._4

IMPOSITION IN A RASTER IMAGE PROCESSOR

BACKGROUND OF THE INVENTION

The present invention relates generally to methods and systems for printing computer generated images and more particularly to methods and apparatus for formatting a sheet in preparation for printing on a printing device.

A computer system can output data to a wide variety of output display devices. Output display devices such as laser printers, plotters, imagesetters, and other printing devices produce an image or "visual representation" on a sheet of paper or the like. A printing device can print dots on a piece of paper corresponding to the information of a bitmap (or pixelmap where a pixelmap is characterized as having a depth of two or more bits). A "raster" printing device creates a visual representation by printing an array of pixels arranged in rows and columns from the bitmap.

One type of printing device is a printing press. A printing press may be used to produce books, newspapers, pamphlets, posters and other single and multi-page printed matter. The printing press advantageously prints multiple pages of printed matter at the same time onto a single sheet. Other devices used for printing multiple pages at the same time include imagesetters and plate setters.

When printing multiple pages, the individual pages are arranged in one or more sheets. Each sheet includes a layout of pages that may be ordered or otherwise optimized to facilitate post-printing processes. Imposition is the pre-printing process of arranging the pages for a sheet to achieve a proper sequence or position of each page relative to other pages. Imposition is performed to facilitate post-printing processes. These processes include fold and cut operations followed by some form of binding.

Conventional imposition processes are executed on a computer workstation prior to the printing process. An imposition process operates on one or more page description language (PDL) files or image data files and layout information for a given sheet. The PDL files are representative of the various pages (or sub-pages) of content to be displayed on a given sheet. The layout information describes how the pages are to be arranged to achieve the desired output result. The output of a conventional imposition process is a single PDL file that includes all the data required (including external references if any) to print the sheet by a printing device.

A process flow for printing a sheet onto an output media is shown in FIG. 1. A plurality of pages of content 2 are arranged to form a sheet 4 by executing an imposition process 3. The imposition process receives as inputs the individual page files, which may be in the form of PostScript® files, printers marks or other objects to be marked on the page, and layout information 5. Layout information 5 describes the layout of the sheet including the location of each object on the sheet. The output of the imposition process is a PDL file that describes the entire sheet 4. The PDL file describing the sheet is transferred to a printing device 6 for printing.

Printing devices that produce output in response to PDL input are widely used. In order to produce a finished sheet, the printing device interprets the data contained in the PDL file, renders objects within the data into bitmaps, and after all objects for the sheet are rendered, prints the sheet. More specifically, printing device 6 includes a raster image processor (RIP) 8. RIP 8 renders objects within the PDL file into bitmaps which are transferred to a print engine (not shown) for printing onto the output media.

SUMMARY

In general, in one aspect, the invention provides a method for imposing and rendering image data. The method formatting the image data for a surface of a media sheet in an output device space and including receiving one or more page description files defining one or more objects to be located on the surface of the media sheet, receiving a job ticket defining a layout of the objects on the surface in a sheet-defined space. Prior to ripping, the layout of the objects is transformed into output device space including rotation or translation of the objects. The objects are ripped creating raster data that is oriented in output device space. The raster data is blitted in blocks without shifting the raster data.

Aspects of the invention include numerous features. The method can include printing the raster data on the surface of the media sheet. An ordered list of objects can be constructed for the surface from the position of each page in output device space and the objects can be ripped in order in accordance with the ordered list. The step of blitting includes compositing objects into a sheet frame buffer. The objects can be ripped in parallel.

The job ticket definition includes a translation matrix for each object where the translation matrix describes a location of the object on the surface in sheet-space after translation or rotation of the object to facilitate post printing operations. The translation matrix may include transformations from bottling and shingling operations. The method includes adjusting rip parameters for the surface in accordance with the output device and ripping the objects using the adjusted rip parameters. The page description files are PDF files. The method includes translating all page description files received into PDF files prior to ripping. The method can be performed in a printing device where the printing device is selected from the group of an imagesetter, a digital press, a printing press and a plate setter.

The step of ripping includes rendering each object creating raster data oriented in output device space. The step of blitting includes compositing objects into a sheet frame buffer. The step of blitting includes compositing the objects into bands for storage in a band buffer. The step of transforming the layout includes transforming the layout to support bottling or shingling operations.

In another aspect, the invention provides a method for bottling image data and includes receiving one or more page description language files defining one or more objects to be displayed on the surface of the media sheet, bottling the objects including defining a rotational or translational transformation of the objects, ripping the objects to produce raster data that is bottled and blitting the raster data.

In another aspect, the invention provides a method for shingling image data and includes receiving one or more page description language files defining one or more objects to be displayed on the surface of the media sheet, shingling the objects including defining a rotational or translational transformation of the objects, ripping the objects to produce raster data that is shingled and blitting the raster data.

In another aspect the invention provides a printing device configured to receive a plurality of page description language descriptions of pages to be printed on a sheet and includes an assembler connected to receive a job ticket including layout and page identifier information for one or more objects to be printed on a sheet and operating to transform the objects from a sheet-defined space to a printer device space. The printing device includes plurality of render engines each operating on objects to produce raster data associated with portions of the sheet and blitter engine operable to blit the raster data in blocks without shifting the raster data.

Among the advantages of the invention are one or more of the following. Pages of a sheet may be ripped in parallel. Bottling and output media orientation issues can be resolved prior to rendering to facilitate efficient post RIP blitting operations.

Other features and advantages of the invention will become apparent from the following description and from the claims.

BRIEF DESCRIPTION OF THE DRAWINGS

FIG. 1 is a process flow of a prior art printing process.

FIG. 2 is a block diagram of a printer according to the invention.

FIG. 3 is a block diagram of an assembler according to the invention.

FIG. 4 is a flow chart for a rendering and marking process for a raster output device including bottling and orientation prior to the RIP process according to the invention.

DETAILED DESCRIPTION

The present invention may be embodied in any output device that receives page description data and produces from the data visual output, for example on a piece of paper. An output device may include a prepress routine for implementing layout functions, one or more raster image processors for producing pixelmaps (or bitmaps depending on the depth of the resultant data) from received data and one or more engines for producing images on varied output media. The invention has particular applicability to printing presses, imagesetters, plate setters, digital presses and the like and will be described in terms of an embodiment in such a device, which will be referred to simply as an imagesetter.

Referring to FIG. 2, an imagesetter 16 receives input data files, from a computer 12, for example, and turns the input data files into marks on a piece of paper by sending signals to a print engine 34. The imagesetter 16 is configured to receive page description language input data files and layout information from one or more users and process it as will be described later. One suitable page description language is the Portable Document Format (PDF) available from Adobe Systems Incorporated of San Jose, Calif. Another suitable page description language is the PostScript® language available from Adobe Systems Incorporated of San Jose, Calif. The PostScript language is described in Adobe Systems Incorporated, Adobe PostScript® Language Reference Manual, Addison-Wesley (2d ed., ©1990). Another suitable page description language is the PCL language available from Hewlett-Packard Company of Palo Alto, Calif. Another page description language is CT and LW by Scitex America, Inc., of Bedford Mass. A page description language file sent to an imagesetter specifies objects to be displayed and related information. A PostScript object can, for example, include a pixelmap defining a pattern of pixels to be displayed, or it can reference an outline curve defining in mathematical terms a shape to be marked. The object can also include other rasterizing information such as font and size.

Imagesetter 16 includes an interface 24, file storage 25, a digital data processor, random access memory 28, and one or more print engines 34. It also includes read-only memory, I/O interfaces, and data transfer paths and busses, none of which are shown, for storing and transferring data in support of the functions described below.

Interface 24 regulates the flow of information between imagesetter 16 and computer 12 according to a standard communication protocol. Alternatively, interface 24 can support a file transfer protocol for sharing files between computers in networks on a intranet or internet. Interface 24 can include a buffer for buffering data received from computer 12 in the event imagesetter 16 is not ready to process or otherwise unable to manipulate the received data. The buffer can be part of file storage 25.

File storage 25 is a mass storage device such as hard disk or disk array for storing files received from computer 12. Each file includes one or more objects associated with a given sheet to be outputted by the imagesetter. Imagesetter 16 can store all the files associated with a particular sheet in file storage 25 prior to rendering data objects associated with a given file. Alternatively, imagesetter 16 can begin render operations prior to the receipt of all page description files based on the availability of a job ticket and the receipt of the page description file page(s) associated with the first object (s) to be rendered in printing the sheet. The rendering process is described in greater detail below.

The processor can be a general or special purpose microprocessor operating under control of computer program instructions executed from a memory. In the implementation illustrated in FIG. 2, the processor includes a number of special purpose sub-processors including an assembler 40, one or more raster image processors (RIPs) 42 and blitter engines 44. Each sub-processor can be a separate circuit able to operate substantially in parallel with the other sub-processors. Some or all of the sub-processors can be implemented as computer program processes (software) tangibly stored in a memory to perform their respective functions. These can share an instruction processor, such as a general purpose integrated circuit microprocessor, or each sub-processor can have its own microprocessor for executing instructions. Alternatively, some or all of the sub-processors can be implemented in an ASIC (application specific integrated circuit). In addition, the sub-processors can be distributed or form a part of computer 12.

Assembler 40 provides front end services for scheduling and initiating the parallel ripping of pages that are to be printed in a sheet. Referring now to FIG. 3, assembler 40 includes a scheduler 100, imposition consultant 102, engine consultant 104 and job ticket player 106.

Engine consultant 104 generates print engine specific data related to the particular print engine 34 that is to be used in printing a particular sheet. Imagesetter 16 can include a plurality of print engines 34 for printing onto a plurality of output media. Engine consultant 104 maintains print engine specific data for each print engine 34 supported by imagesetter 16. The print engine specific data includes raster width and height, resolution, margins, scan direction and feed direction.

Job ticket player 106 receives as an input a job ticket that describes the layout of the various pages on the sheet. Job tickets are described in greater detail in commonly owned and co-pending application entitled "In-RIP Sorting of Objects in the Slow Scan Direction", to Craig Benson et. al., filed Oct. 16, 1998 and assigned Ser. No. 09/173,851, the contents of which is expressly incorporated herein by reference.

The job ticket includes layout information including a list of sheets (surfaces) to be printed and a print engine identifier for each sheet. The job ticket includes, for each sheet, an list of objects to be printed on the sheet and position orientation information for each object. Each object includes object type, size and placement information. Object types can be selected from a PostScript or PDF file, a printers mark, or other proprietary or non-proprietary type of input.

The placement information locates the object on the sheet and can be in the form of a transformation matrix which describes the placement of the object on the page relative to a page origin. The placement information can include bottling, shingling or other transformations of the object required to support post-printing processes. In one implementation, a transformation matrix and a clip path are used to locate each object on the sheet. The transformation matrix defines where on the sheet surface a particular object is to be placed and includes any translation and/or rotation to be applied to the object. The clip path indicates any clipping to be done to the particular object prior to placement at the location indicated by the transformation matrix. For each sheet, job ticket player 106 provides an object list and associated object information to the imposition consultant 102.

Imposition consultant 102 receives as input an object list for a sheet and engine parameters associated with the particular print engine that is to print the sheet. The engine parameters are retrieved from engine consultant 106 based on the print engine identifier for the given sheet. The engine parameters include the scan direction and feed direction associated with the particular print engine 34. In addition, imposition consultant 102 passes sheet size and resolution information to engine consultant 104 which in turn returns raster height, width, margin and other print engine specific information describing the output device space. Imposition consultant 102 includes a sorting engine 108 for sorting the object list based on the engine parameters. In one implementation, all the objects are sorted in the slow scan direction of the printing engine while maintaining the relative order found in the object list when considering overlapping objects. The sorted list is provided to scheduler 100.

For each object to be placed on a sheet, imposition consultant 102 determines the orientation of the object to the media and the media scan direction and adjusts the transformation matrix for each object based on the media scan direction and orientation. The adjustment of the transformation matrix is described in greater detail below.

Imposition consultant 102 generates a description of the surface to be printed and sends it to a blitter engine 44. Blitter engine 44 constructs the sheet assembling the individual ripped objects (bitmaps for objects) as they are produced by the various RIPs 42. The description provided by the imposition consultant 102 includes placement and paint order information for each object to be painted on the sheet.

In addition, imposition consultant 102 calculates RIP parameters (engine margins, raster width, height, orientation (portrait or landscape)) for each object based on the engine parameters and object information provided from job ticket player 106.

Scheduler 100 processes the ordered lists. For each list, scheduler extracts objects in order and passes the objects along with RIP parameters generated by the imposition consultant 102 to RIPs 42 for processing.

Imagesetter 16 can include a plurality of RIPs 42. Each RIP receives as an input an object to be ripped and RIP parameters for controlling the render process. A RIP converts the high level object description into a bitmap for storage in a raster buffer. The output of a RIP is a bitmap describing the object which in turn is provided as an input to a blitter engine 44. For example, where the object processed is a page to be printed on the output media, a RIP 42 produces raster data which is a superset of the original page such that the rotated and offset page fits within the non-rotated sheet frame buffer.

In one implementation, each RIP is identical, and can be used to process any object to be painted on the sheet. Plural RIPs allows for the simultaneous processing of objects and speeds the assembly process. Alternatively, RIPs 42 can be of different types allowing for customized processing of objects of differing types. For example, imagesetter 16 can include separate RIPs for processing graphics and text type objects. RIPs can be customized to speed the raster generation process.

Scheduler 100 oversees the delivery of objects to the individual RIPs 42. In one implementation, objects are screened based on object type and provided to the appropriate RIPs as the RIPs become available. To avoid a bottleneck condition at a single RIP, multiple RIPs of the same type can be included. Alternatively, general purpose RIPs can be included for processing all types of objects. After the successful rendering of an object (or portion of an object attributable to a band being rendered) and subsequent transfer of a bitmap to a blitter engine, a RIP 42 can request another object for processing. Scheduler 100 services the requests from the plurality of RIPs and passes objects and RIP parameter information to each RIP in accordance with the ordered list.

A blitter engine 44 assembles a sheet based on the description provided by the imposition consultant 102 by compositing each object into a sheet raster buffer (frame buffer). The description includes placement and paint order information for each object to be painted on the sheet. The blitter engine retrieves pixelmaps from a RIP based on the paint order and draws the pixelmap into the frame buffer. Objects are extracted from the various RIPs in order to support the assembly of the sheet in accordance with the scan direction and feed direction of the print engine. The frame buffer is oriented in output device space. Objects are painted into the frame buffer based on the location information provided from the imposition consultant. The pixelmaps retrieved from the RIPs are properly oriented in device space and are not required to be further manipulated or transformed by the blitter engine 44. The output of each RIP is a band of transformed (oriented) data that is painted into the sheet frame buffer by the blitter. Accordingly, block blitting of the data received from the RIPs into the sheet frame buffer can be realized.

After all of the objects associated with a given sheet (surface) have been rendered by a RIP 42 and assembled by a blitter engine into a sheet in the frame buffer, the pixelmap data stored in the frame buffer can be applied to the media by the designated print engine 34. Alternatively, the frame buffer can be sized to store only a portion of the sheet. The print engine can be activated prior to ripping all of the objects for a sheet after an initial portion of data (a band) is processed by blitter engine 44 as will be described in greater detail below.

Imagesetter 16 can include a plurality of blitter engines for constructing a plurality of sheets (surfaces). Separate blitter engines can be used for each color plane in a color printing application. Alternatively, a sheet can be divided into sub-portions and a blitter engine can be assigned to assemble the particular sub-portion.

RAM 28 is a random access memory used by the processor (sub-processors 40–44). RAM 28 can be embodied in one or more memory chips. The memory can be partitioned or otherwise mapped to reflect the boundaries of the various memory sub-components. RAM 28 can include a frame buffer for storing a sheet, or portion thereof, prior to printing by a print engine.

Data flow, rather than physical interconnection, is illustrated between elements of imagesetter 16. Processor and memory components are physically interconnected using a conventional bus architecture.

The imagesetter components that have been described can be packaged in a single product; alternatively, some can be included in computer 12 or otherwise housed separately.

Referring now to FIGS. 3 and 4, a conventional rendering and marking process for a raster output device is enhanced by the addition of a method 400 of pre-rip bottling and orientation. Imagesetter 16 receives one or more PDL files representative of pages or sub-pages to be displayed on a given sheet from computer 12 (402). The files are transferred to file storage 25 for storage until a RIP process is invoked (404).

Assembler 40 receives a job ticket associated with one or more sheets to be processed (406). The job ticket defines both media requirements, document location and layout for each content element to be placed in a final sheet. In one embodiment, assembler 40 waits until all of the files associated with a given sheet have been received and stored in file storage 25 before beginning the assembly process. Alternatively, assembler 40 can begin the assembly process after the job ticket and a first file is received.

Imposition consultant 102 in assembler 40 processes each job ticket and creates for each surface (where a sheet may have more than one surface, e.g., top surface and bottom surface of a single sheet) a list of objects to be printed on a given surface (408). Each entry includes an object identifier (number), transformation matrix information and clipping information associated with the object which is derived from the job ticket. As described above, the transformation matrix indicates sheet placement for a given object.

Engine parameters associated with the particular print engine that is to print the sheet are retrieved (410). More specifically, imposition consultant 102 queries engine consultant 104 for the particular engine parameters associated with the print engine as designated by the print engine identifier for the sheet. Engine consultant 104 returns engine specific information including raster edge width and height, long edge, short edge, scan direction, and feed direction. Imposition consultant 102 adjusts the placement of each object based on the specific print engine parameters (412). More specifically, imposition consultant 102 rotates and transforms the transformation matrix and, as appropriate, the clip path, to locate the object in device space.

A bounding box associated with the rotated and translated clip path as defined by the adjusted transformation matrix is produced (414). The bounding box defines a region in output device space that is to contain the raster data associated with the object. The actually area for the raster data is determined by the RIP and may or may not exactly conform to the calculated bounding information developed by the imposition consultant depending on the RIP performance or other limitations. The scan unit boundaries for the clip path are determined (416). The objects in the list are then sorted based on the slow scan and feed direction (418).

A description of the sheet is provided to a blitter engine 44 (422). The description includes placement and paint order information for each object to be placed on the sheet and can include the bounding box information. The placement information is in the form of a destination address in output device space at which the blitter engine is to start to paint the raster data associated with the given object.

Finally, the imposition consultant calculates RIP parameters for each object (424) and passes the sorted object list and RIP parameters to a scheduler for processing (426). The RIP parameters include object size, raster buffer size to be marked (in device pixels) and the margins (in device pixels). The object size defines the physical dimensions of the object in the output media. The margins reflect the offset from the page origin location, e.g., PostScript (0,0), to the nearest corner in the raster buffer.

As RIPs become available, the scheduler 100 in assembler 40 sends the individual objects to a RIP for rendering in accordance with the specified RIP parameters (428). When all of the objects associated with a first band to be painted on the sheet have been rendered by a RIP, blitter engine 44 retrieves the bitmap(s) and paints the bitmap(s) into a frame buffer (430). The blitter engine retrieves objects in order from the RIPs based on the ordering received as part of the description from the imposition consultant. The painting of the bitmaps into the frame buffer is performed in accordance with the placement information received as part of the description. More specifically, the placement information includes a starting address in output device space for painting the given object. The RIP provides the raster data to the blitter engine upon request as well as a definition of the raster height and width that is to be painted. The blitter engine starts the paint at the designated starting address and advances to new scanlines depending on the height and width information.

In one implementation, scheduler 100 divides and sorts each object (based on its respective location in the final sheet as defined by the transformation matrix data derived in step 412) into one or more bands associated with the output media. Each band can contain one or more objects (display data) or portions of objects. When all of the objects for a given band in a surface to be printed have been received, then the scheduler can send the objects to a RIP to produce pixelmaps. The resultant pixel data can be painted into one or more band buffers of varied size (typically 256, 512 or 1024 scan lines in size) rather than a frame buffer.

After all of the display data is assembled by blitter engine 44, the resultant pixelmap data can be sent to print engine 34 for printing the particular surface (432). The pixelmap data can be sent to the print engine a band at a time as soon as the bands are rendered. Alternatively, the pixelmaps can be stored in a data storage mechanism (such as file storage 25) for printing at a later time.

The present invention has been described in terms of specific embodiments, which are illustrative of the invention and not to be construed as limiting. The invention can be implemented in hardware, firmware or software, or in a combination of them. Other embodiments are within the scope of the following claims.

What is claimed is:

1. A method for imposing and rendering image data, the method formatting the image data for a surface of a media sheet in an output device space, the method comprising:

receiving one or more page description files defining one or more objects to be located on the surface of the media sheet;

receiving a job ticket defining a layout of the objects on the surface in a sheet-defined space;

prior to ripping, transforming the layout of the objects into output device space including rotation or translation of the objects;

ripping the objects creating raster data that is oriented in output device space; and blitting the raster data in blocks without shifting the raster data.

2. The method of claim 1 further including printing the raster data on the surface of the media sheet.

3. The method of claim 1 further comprising constructing an ordered list of objects for the surface from the position of each page in output device space; and ripping the objects in order in accordance with the ordered list.

4. The method of claim 3 where the step of blitting includes compositing objects into a sheet frame buffer, in accordance with the order defined by the ordered list.

5. The method of claim 1 where the objects are ripped in parallel.

6. The method of claim 1 where the job ticket definition includes a translation matrix for each object and where the translation matrix describes a location of the object on the surface in sheet-space after translation or rotation of the object to facilitate post printing operations.

7. The method of claim 6 where translation matrix includes a translation of the object from a bottling or shingling operation.

8. The method of claim 1 further comprising adjusting rip parameters for the surface in accordance with the output device; and ripping the objects using the adjusted rip parameters.

9. The method of claim 1 wherein the page description files are PDF files.

10. The method of claim 1 further including translating all page description files received into PDF files prior to ripping.

11. The method of claim 1 wherein the method is performed in a printing device and where the printing device is selected from the group of an imagesetter, a digital press, a printing press and a plate setter.

12. The method of claim 1 wherein the step of ripping includes rendering each object creating raster data oriented in output device space.

13. The method of claim 1 where the step of blitting includes compositing objects into a sheet frame buffer.

14. The method of claim 13 where the step of blitting includes compositing the objects into bands for storage in a band buffer.

15. The method of claim 1 where the step of transforming the layout includes transforming the layout to support bottling operations.

16. The method of claim 1 where the step of transforming the layout includes transforming the layout to support shingling operations.

17. A method for bottling image data, the method formatting the image data for a surface of a media sheet in an output device space, the method comprising:

receiving one or more page description language files defining one or more objects to be displayed on the surface of the media sheet;

bottling the objects including defining a rotational or translational transformation of the objects;

ripping the objects to produce raster data that is bottled; and blitting the raster data.

18. A method for shingling image data, the method formatting the image data for a surface of a media sheet in an output device space, the method comprising:

receiving one or more page description language files defining one or more objects to be displayed on the surface of the media sheet;

shingling the objects including defining a rotational or translational transformation of the objects;

ripping the objects to produce raster data that is shingled; and blitting the raster data.

19. A printing device configured to receive a plurality of page description language descriptions of pages to be printed on a sheet, comprising:

an assembler connected to receive a job ticket including layout and page identifier information for one or more objects to be printed on the sheet and operating to transform the objects from a sheet-defined space to a printer device space;

a plurality of render engines each operating on objects to produce raster data associated with portions of the sheet; and a blitter engine operable to blit the raster data in blocks without shifting the raster data.

* * * * *